UNITED STATES PATENT OFFICE.

HORATIO R. BODINE, OF SPRINGFIELD TOWNSHIP, (ZANESVILLE P. O.,) MUSKINGUM COUNTY, OHIO.

MANUFACTURE OF POTTERY-WARE.

SPECIFICATION forming part of Letters Patent No. 232,331, dated September 21, 1880.

Application filed July 8, 1880. (No model.)

*To all whom it may concern:*

Be it known that I, HORATIO R. BODINE, a citizen of the United States, residing in Springfield township, (Zanesville P. O.,) in the county of Muskingum and State of Ohio, have invented a certain new and useful Improvement in the Manufacture of Pottery-Ware to be used for Cooking Purposes; and I do hereby declare that the following is a full, clear, and exact description of the invention, which will enable others skilled in the art to which it appertains to make and use the same.

Heretofore cooking-vessels made of pottery-ware were glazed with lead glazing. The lead glazing is found to be objectionable, because it soon becomes affected by the vegetable acids, and comes off and taints the contents with poison; but the clay glazing, (glazing made of slip-clay, such as stoneware is glazed with) is not affected by the vegetable acids. Therefore a good clay glazing on vessels used for cooking purposes is very desirable; but the clay glazing requires a high heat to melt it, and this requires the vessels to be burned so hard in their manufacture that they break by heat when used for cooking if they are made out of potter's clay, in the usual manner.

The object of my invention is to produce a composition (for making cooking-vessels) that can be brought to a high heat, sufficient to melt the clay glazing, and the material of the vessel not become vitrified by the high heat, but remain porous, so the vessel will not break when used over the fire for cooking purposes.

To carry my invention into effect I produce this composition by mixing sand with potter's clay in quantity sufficient to prevent the potter's clay from becoming vitrified or flinty when burned sufficiently to melt the glazing of the vessel. The sand not melting causes the material of the vessel to remain porous, so it will not crack or fly by heat when the vessel is used over the fire.

Some potter's clay requires more sand than others. The amount of sand required may be known as follows: After the vessel is well burned, if it is too porous and too easily broken, then less sand is required; but if the vessel is not sufficiently porous, but too flinty to stand the heat when used, then clay of that kind or quality requires more sand mixed with it. Some kinds of potter's clay require the composition to be one-third sand; some kinds require it to be half sand, varying from one-third sand up to one-half, or more, according to the purity of the potter's clay.

Any kind of pure sand and any kind of pure potter's clay may be used for the composition.

In order to prepare the composition the sand and clay are mixed in the required proportions, then are pulverized and tempered with water by any of the usual means for preparing potter's clay. Then the composition is ready to be molded into form of vessels, which are glazed with a clay glazing and then burned in a potter's kiln, the same as other pottery-ware.

I am aware that it is not new to mix sand with potter's clay for the manufacture of crucibles.

I am also aware that it is not new to employ a clay or slip glaze in the manufacture of pottery-ware; but

What I claim as my invention, and desire to secure by Letters Patent, is—

As an improvement in the manufacture of pottery-ware, fire-proof vessels for cooking and other purposes composed of potter's clay and sand, as set forth, combined with a clay or slip glaze.

HORATIO R. BODINE.

Witnesses:
RICHARD BELL,
ADOLPHUS W. SEARCH.